T. J. CHAPPELL.
LICENSE TAG HOLDER.
APPLICATION FILED AUG. 1, 1919.
1,338,422.
Patented Apr. 27, 1920.
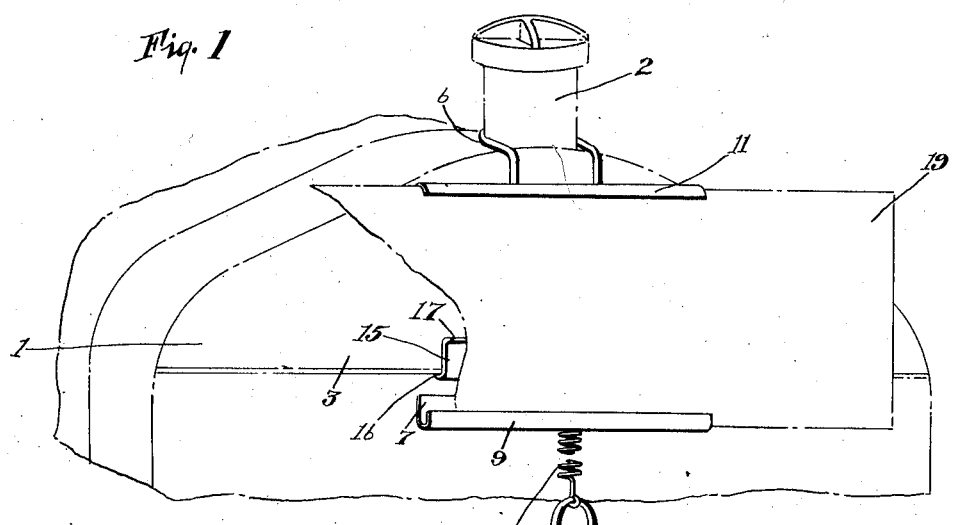
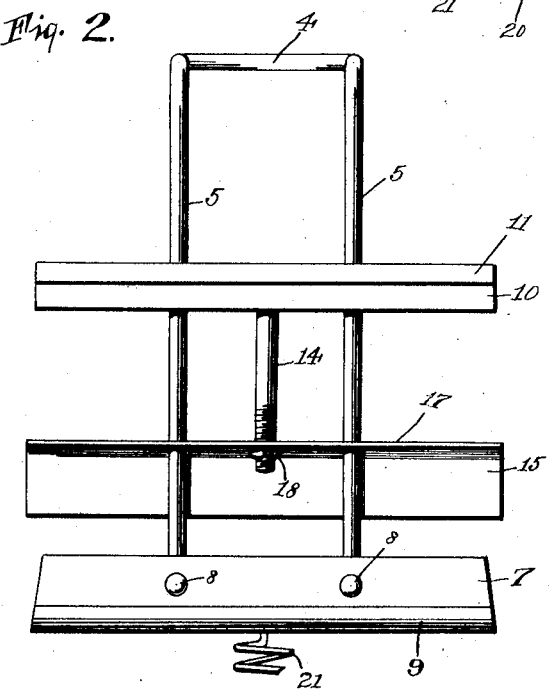
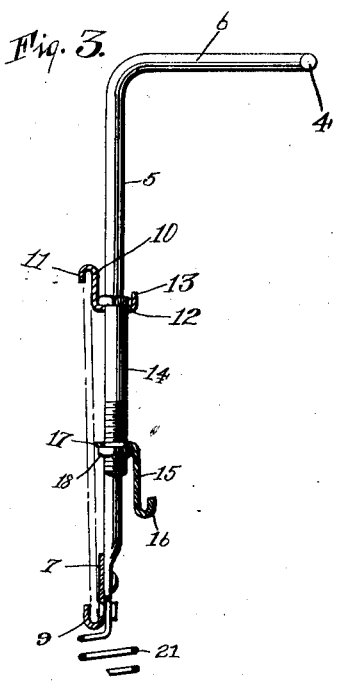
WITNESSES
INVENTOR
T. J. Chappell.
BY
ATTORNEYS

UNITED STATES PATENT OFFICE.

THOMAS J. CHAPPELL, OF CASSELTON, NORTH DAKOTA.

LICENSE-TAG HOLDER.

1,338,422.  Specification of Letters Patent.  Patented Apr. 27, 1920.

Application filed August 1, 1919. Serial No. 314,624.

*To all whom it may concern:*

Be it known that I, THOMAS J. CHAPPELL, a citizen of the United States, and a resident of Casselton and county of Cass and State of North Dakota, have invented certain new and useful Improvements in License-Tag Holders, of which the following is a specification.

My invention is an improvement in license tag holders for motor vehicles, and has for its object to provide a simple, inexpensive device of the character specified, which may be detachably connected with the hood of a motor vehicle, and with the license tag, in a manner to be easily removed when desired, and wherein the holder has means for preventing swinging of the crank.

In the drawings:—

Figure 1 is a perspective view of a portion of the hood of a motor vehicle provided with the improved holder.

Fig. 2 is a front view of the holder,

Fig. 3 is a vertical section.

The present embodiment of the invention is shown in connection with the hood 1 of a motor vehicle, being connected with the filling nipple 2 for the radiator and the shelf 3 at the front thereof. The holder comprises a yoke formed from wire or the like and comprising a body 4 and arms 5, the body and a portion of the arms being bent at a right angle with respect to the remainder of the arms as shown at 6 so that the body is offset laterally from the plane of the arm.

A plate 7 is secured to the front ends of the arms, by means of rivets 8 or the like and transversely of the arms, and this plate has a channel 9 at its lower edge. Another plate 10 is mounted to slide on the arms above the plate 7, and this plate 10 also has a channel 11 at its upper edge.

The plate 10 has a lateral extension 12 at its lower edge, extending at a right angle to the body of the plate, and having openings through which the arms 5 slide. The rear edge of the extension is bent upwardly as shown at 13.

A bolt 14 is arranged at the center of the extension 12, the head of the bolt being within the channel formed between the plate 10 and the upwardly bent portion 13 and a third plate 15 is connected with the bolt. This plate 15 has a channel 16, at its lower edge, and the said plate is arranged in rear of the arms 5. The plate 15 also has a forwardly extending flange 17 at its upper edge, and this flange 17 has openings for receiving the arms 5 and for receiving the bolt 14. A nut 18 is threaded onto the bolt below the flange 17, and it will be evident that by turning the nut, the plate 15 may be adjusted toward and from the plate 11.

In use, the parts are arranged as shown in Figs. 1 and 2, the body 4 and the bent portions 6 of the arms embracing the filling nipple 2 of the radiator, with the main portions of the arms depending along the front of the hood. The flange 16 of the plate 15 is engaged beneath the shelf 3 of the radiator, after which the nut 18 is tightened, thus firmly clamping the holder to the radiator. The license tag indicated at 19 is engaged between the flanges 9 and 11 of the plates 7 and 10.

In order to prevent swinging of the crank, a ring 20 is connected with the plate 7, by means of a coil spring 21. This ring depends below the holder, and is slipped over the crank, the spring permitting the ring to be so engaged and preventing swinging of the crank after the ring is engaged.

It will be understood that after the plate 15 has been firmly engaged with the radiator shelf, further turning of the nut 18 will move the plate 11 toward and from the plate 7, to adjust the grasp of these plates on the license tag.

I claim:—

1. A holder for license tags for motor vehicles, comprising a yoke, the body of the yoke engaging the filling nipple of the radiator, and arms depending in front of the radiator, a channel plate secured to the lower ends of the arms, a channel plate slidable on the arms toward and from the first named plate, said plates being adapted to engage the license tag, a third channel plate in rear of the arms and adjustably connected with the second named plate to be moved toward and from the same and adapted to engage beneath the lower edge of the uper shelf of the radiator.

2. A holder of the character specified, comprising upper and lower holding plates having means for engaging the upper and lower edges of a tag, a third plate having means for engaging the lower edge of a fixed support, a support for the plates having means for engaging the other edge of the fixed support, and means for moving the upper tag engaging plate and the lower fixed support engaging plate toward each other to cause the plates to simultaneously clamp the tag and the fixed support.

THOMAS J. CHAPPELL.